US011571010B2

(12) United States Patent
Shin

(10) Patent No.: US 11,571,010 B2
(45) Date of Patent: Feb. 7, 2023

(54) FOIE GRAS USING THE LIVER OF DUCK WITHOUT FORCE-FEEDING METHOD, ITS COMPOSITION AND MANUFACTURING METHOD

(71) Applicant: 153 KOREA CO., LTD., Gyeonggi-do (KR)

(72) Inventor: Dong-Wook Shin, Seoul (KR)

(73) Assignee: 153 KOREA CO., LTD., Gyeonggi-do (KR)

( * ) Notice: Subject to any disclaimer, the term of this patent is extended or adjusted under 35 U.S.C. 154(b) by 417 days.

(21) Appl. No.: 16/759,682

(22) PCT Filed: Nov. 9, 2018

(86) PCT No.: PCT/KR2018/013597
§ 371 (c)(1),
(2) Date: Apr. 27, 2020

(87) PCT Pub. No.: WO2020/096088
PCT Pub. Date: May 14, 2020

(65) Prior Publication Data
US 2021/0000148 A1    Jan. 7, 2021

(51) Int. Cl.
*A23L 13/20* (2016.01)
*A23L 13/50* (2016.01)
(Continued)

(52) U.S. Cl.
CPC ............... *A23L 13/52* (2016.08); *A23L 5/27* (2016.08); *A23L 13/20* (2016.08); *A23L 13/70* (2016.08)

(58) Field of Classification Search
CPC . A23L 13/52; A23L 13/70; A23L 5/27; A23L 13/20
(Continued)

(56) References Cited

FOREIGN PATENT DOCUMENTS

| CN | 105475865 A | 4/2016 |
|----|-------------|--------|
| JP | S60-120943 A | 6/1985 |

(Continued)

OTHER PUBLICATIONS

"Soju." Merriam-Webster.com Dictionary, Merriam-Webster, <https://www.merriam-webster.com/dictionary/soju>. Accessed Oct. 28, 2022.
(Continued)

*Primary Examiner* — Brent T O'Hern
(74) *Attorney, Agent, or Firm* — Medler Ferro Woodhouse Mills PLLC

(57) ABSTRACT

The present invention provides a spread type processed food using foie gras (duck liver, goose liver) and chicken breasts, a composition thereof and a method for manufacturing the same, and more particularly, a spread type processed food using foie gras and chicken breasts, which is manufactured using foie gras and chicken breasts in a spread form such as butter or jam that can be simply spread on a preferred food such as bread and easily eaten, wherein fishy smell and peculiar smell (odor) of foie gras are effectively removed to allow people of all ages and both sexes to easily eat without repulsion, and the processed food is rich in protein and contains diverse vitamins to promote brain development of growing children and protect various diseases, thereby planning promotion of public health, as well as a composition thereof and a method for manufacturing the same.

2 Claims, 1 Drawing Sheet

(51) Int. Cl.
*A23L 13/70* (2016.01)
*A23L 5/20* (2016.01)

(58) Field of Classification Search
USPC .......................................................... 426/641
See application file for complete search history.

(56) References Cited

FOREIGN PATENT DOCUMENTS

| KR | 10-2002-0053210 A1 | 2/2003 |
| KR | 10-0781788 B1 | 12/2007 |
| KR | 10-2009-0114804 A1 | 11/2009 |
| KR | 10-2013-0063634 A1 | 6/2013 |
| KR | 10-1334087 B1 | 11/2013 |
| KR | 10-2018-0122823 A1 | 11/2018 |
| KR | 10-2019-0017250 A1 | 2/2019 |
| WO | WO-2020096088 A1 * | 5/2020 |

OTHER PUBLICATIONS

"Soju," Oct. 15, 2022, Wikipedia, <https://en.wikipedia.org/wiki/Soju>. Accessed Oct. 28, 2022.

Hines, N. "Soju: Everything You Need to Know About Korea's National Drink," Jan. 21, 2022, VinePair, <https://vinepair.com/articles/soju-koreas-national-drink/>. Accessed Oct. 28, 2022.

Jung, J. "Soju: liquor that offers 'bittersweet' experience," Aug. 4, 2022, Korea.net, <https://www.korea.net/NewsFocus/FoodTravel/view?articleId=218975>. Accessed Oct. 28, 2022.

Bird, J. "What is Medium Heat on a Grill: Cracking the Temperature Code of Your BBQ," Apr. 10, 2021, BoatBasinCafe, <https://boatbasincafe.com/what-is-medium-heat-on-a-grill/>. Accessed Oct. 28, 2022.

* cited by examiner

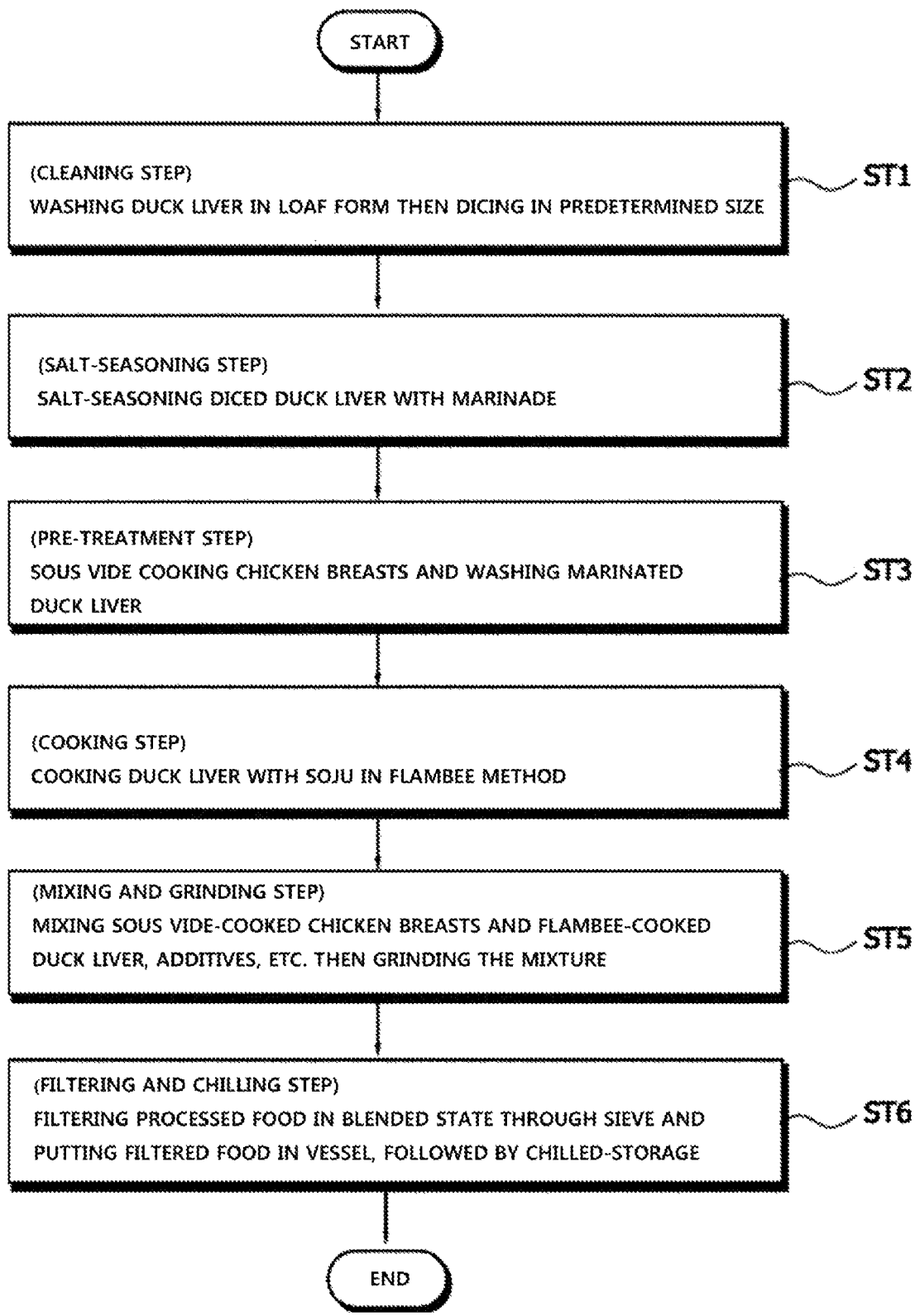

FOIE GRAS USING THE LIVER OF DUCK WITHOUT FORCE-FEEDING METHOD, ITS COMPOSITION AND MANUFACTURING METHOD

TECHNICAL FIELD

The present invention relates to a spread type processed food using foie gras (duck liver, goose liver) and chicken breasts, a composition thereof and a method for manufacturing the same, and more particularly, to a spread type processed food using foie gras and chicken breasts, which is manufactured using foie gras and chicken breasts in a spread form such as butter or jam that can be simply spread on a preferred food such as bread and easily eaten, wherein fishy smell and peculiar smell (odor) of foie gras are effectively removed to allow people of all ages and both sexes to easily eat without repulsion, and the processed food is rich in protein and contains diverse vitamins to promote brain development of growing children and protect various diseases, thereby planning promotion of public health, as well as a composition thereof and a method for manufacturing the same.

BACKGROUND ART

Typically, foie gras is a French term referring to a duck or goose liver and known as one of the world's three major delicacies. Diverse dishes and processed foods containing the foie gras as a main raw material have been introduced in Europe including France because of butter-like soft taste and excellent flavor.

Generally, the duck liver is mostly used as the foie gras in terms of price. The duck liver contains amino acids and abundant protein acting as a catalyst material for various chemical reactions in cells, thereby planning health promotion, and contains vitamin A, E, etc. for enhancing resistance to diseases, as well as reducing a harmful LDL cholesterol level while raising a beneficial HDL cholesterol level, and thereby preventing cardiovascular disease. Further, the duck liver contains a large amount of iron and manganese, such that deficiency anemia may be prevented while reducing a degradation in the resistance to disease, fatigue, and headaches, etc., and calcium and manganese necessary for the growing children may also be provided to strengthen bone, thereby enabling formation of a stable bone structure.

As such, a variety of recipes for haute cuisine including foie gras has been developed due to potency and flavor thereof, and foie gras itself has renown as one of the three dishes around the world along with caviar and truffles. However, despite of various developed recipes, the foie gras has a limitation in applying to diverse processed foods as favorite foods for children as well as general dishes because it is difficult to effectively remove the fishy smell and peculiar smell of the duck liver.

Accordingly, methods for removing peculiar smell or odor of the liver by adding spices thereto have been proposed in, for example, Korean Patent Laid-Open Publication No. 10-2009-0114804, Korean Patent Laid-Open Publication No. 10-2002-0053210, Korean Patent Registration No. 10-1334087 and the like. In particular, Korean Patent Registration No. 10-1334087 discloses a method for removing fishy smell or odor of a duck liver by introducing medical herbs, for example, *Angelica gigas* NAKAI, hawthorn and *Maximowiczia chinensis*, etc. into the duck liver, instead of such spices.

However, the methods proposed in Korean Patent Laid-Open Publication No. 10-2009-0114804, Korean Patent Laid-Open Publication No. 10-2002-0053210 and Korean Patent Registration No. 10-1334087 are all a simple method of mixing a loaf of duck liver with the medicinal herbs or spices in order to remove the fishy smell and odor, which involves a problem in which distinctive aroma of the spices and/or medicinal herbs may not deeply penetrate into the duck liver but only exist on an outer surface thereof after cooking.

For this reason, the processed foods produced by the conventional manufacturing methods have a problem in which the fishy smell and odor latent in the duck liver come out to cause displeasure and repulsion during chewing the same, thereby degrading food texture or mouthfeel, in particular, children and women very sensitive to the smell may be repulsed by the fishy smell and odor of such a liver, hence causing limits in applying foie gras to any processed food in a spread form such as butter or jam, which is spread on and eaten along with bread.

SUMMARY OF INVENTION

Problems to be Solved by Invention

Accordingly, in consideration of the above-mentioned problems of the prior art, it is an object of the present invention to provide a spread type processed food using foie gras and chicken breasts, which is capable of: helping brain development, growth and development of growing children; preventing various diseases with immune enhancement in order to plan promotion of public health; effectively removing fishy smell and peculiar smell (odor) of foie gras; being manufactured as a processed food in a spread form such as butter or jam, which may be simply applied to a preferred bread for children (sandwich) and easily eaten, such that people of all ages and both sexes can eat the same without repulsion, as well as a composition thereof and a method for manufacturing the same.

Means for Solving Problems

In order to achieve the above object, the present invention provides a composition for a spread type processed food using foie gras and chicken breasts, which includes: 9 to 14% by weight ('wt. %') of duck liver; 38 to 50 wt. % of chicken breasts; 10 to 14 wt. % of butter; 17 to 23 wt. % of whipped cream; 1.3 to 1.6 wt. % of brandy; and 5 to 7 wt. % of cassava powders, and the balance including additives and purified water.

In addition, 1.4 to 1.6 wt. % of chopped and ground ginseng or 7 to 9 wt. % of honey may be further included.

Further, the additives may include, for example, 0.8 to 1.0 wt. % of sugar, 0.8 to 1.0 wt. % of salt, 0.2 to 0.4 wt. % of pepper, 0.17 to 0.18 wt. % of phosphate and 0.01 to 0.03 wt. % of antioxidant.

Further, the present invention provides a method for manufacturing a spread type processed food using foie gras and chicken breasts, which includes: (a) washing a loaf of duck liver with running water to remove secretions; (b) dicing the loaf of duck liver into a uniform size; (c) salt-seasoning the diced duck liver with a marinade prepared by mixing 5 g of garlic and 20 ml of Korean wine, 'soju', for 50 to 80 minutes to primarily remove liver smell; (d) vacuum packing raw chicken breasts and cooking the same in sous vide mode at 50 to 80° C. for 20 to 50 minutes; (e) washing the marinated duck liver with clean water, pouring 50 ml of soju to the marinated duck liver, and then, cooking the same in Flambee method at 78 to 110° C. or more for 5 to 10 minutes in order to secondarily remove the liver smell; and (f) introducing 9 to 14 wt. % of the Flambee-cooked duck liver, 38 to 50 wt. % of the sous vide-cooked chicken breasts, 10 to 14 wt. % of butter, 17 to 23 wt. % of whipped cream, 1.3 to 1.6 wt. % of brandy, 5 to 7 wt. % of cassava powders and the additives and purified water into a blender, followed by finely grinding the mixture, so as to manufacture a processed food in a spread form.

In addition, between steps (a) and (b), the manufacturing method may further include: injecting a liver smell removing solution, which is prepared by mixing 20 ml of soju, 5 g of ground garlic and 10 ml of citron liquid, into the duck liver through a syringe, steaming the duck liver in a steamer over medium heat for 1 to 2 minutes to boil the surface of the duck liver only while preventing the liver smell removing solution from spilling out of the duck liver, followed by rotating the duck liver at 100 to 300 RPM for 1 to 2 minutes so as to allow the liver smell removing solution injected into the duck liver to evenly penetrate inside the duck liver.

Further, the present invention provides a processed food produced by the method for manufacturing a spread type processed food using foie gras and chicken breasts.

Advantageous Effects

As described above, the present invention is directed to a method for manufacturing a processed food including foie gras and chicken breasts in a spread form such as butter or jam that can be spread on a preferred food, i.e., bread (sandwich) and easily eaten, which includes salt-seasoning and cooking a loaf of foie gras after dicing the same into a uniform size to effectively remove fishy smell and peculiar smell (odor) of the foie gras, so that people of all ages and both sexes can easily eat the same without repulsion, and the processed food is rich in protein and contains diverse vitamins to promote brain development of growing children and protect various diseases, thereby planning promotion of public health.

BRIEF DESCRIPTION OF DRAWINGS

FIG. 1 is a flow chart illustrating a process of a method for manufacturing a processed food according to an embodiment of the present invention.

MODE FOR CARRYING OUT INVENTION

The processed food according to the present invention may include foie gras and chicken breasts as main raw materials and may further include butter, whipped cream, brandy, cassava powders and additives other than the main raw materials. The foie gras used herein is the liver of a duck and the additives may include sugar, salt, pepper, phosphates and an antioxidant.

In addition, in order to redouble flavor, the processed food of the present invention may further include raw ginseng.

Further, the processed food of the present invention may include honey in place of sugar in the additives.

A content of the duck liver may range from 9 to 14 wt. %, and preferably, 11 to 13 wt. %. If the content of the duck liver is less than 9 wt. %, due to a larger content of the chicken breasts relative to the duck liver, food texture (spreadability) and overall preference are decreased. Meanwhile, if the content thereof exceeds 14 wt. %, due to a larger content of the duck liver relative to the chicken breasts, the liver smell removal step of removing fishy smell and peculiar smell of the duck liver becomes complicated and longer in the manufacturing process of the processed food, thus to take much longer cooking time while lowering overall preference.

A content of the chicken breasts may range from 38 to 50 wt. %, and preferably, 41 to 46 wt. %. If the content of the chicken breasts is less than 38 wt. %, due to a larger content of the duck liver relative to the chicken breasts, the liver smell removal step of removing fishy smell and peculiar smell of the duck liver becomes complicated and longer, thus to take much longer cooking time while lowering overall preference. Meanwhile, if the content thereof exceeds 50 wt. %, due to a larger content of the chicken breasts relative to the duck liver, food texture is dry and crumbling, and overall preference are decreased.

The butter and the whipped cream are added for soft texture. Further, a content of the butter may range from 10 to 14 wt. %, and preferably, 11 to 13 wt. %, while a content of the whipped cream may range from 17 to 23 wt. %, and preferably, 19 to 22 wt. %. If the content of the butter is less than 10 wt. %, food texture and overall preference are decreased. Meanwhile, if the content thereof exceeds 14 wt. %, overall preference is decreased due to the greasy taste. Further, if the content of the whipped cream is less than 17 wt. %, food texture and overall preference are decreased. Meanwhile, if the content thereof exceeds 23 wt. %, likewise the butter, greasy taste is strong to degrade overall preference.

The brandy is used to remove the fishy smell and odor of the duck liver while endowing flavor, and a content thereof may range from 1.3 to 1.6 wt. %. Further, the cassava powders added herein contains a large amount of vitamin C to help iron absorption, and is rich in dietary fibers to give aid for digestion and to tenderize the food texture, and a content thereof may range from 5 to 7 wt. %.

As the additives, sugar and salt may be added in a content of 0.8 to 1.0 wt. %, respectively. A content of the black pepper may range from 0.2 to 0.4 wt. %. The phosphate and the antioxidant are additives for inhibiting microbial growth and preventing oxidation. A content of the phosphate may range from 0.17 to 0.18 wt. %, while a content of the antioxidant may range from 0.01 to 0.03 wt. %.

The raw ginseng is used in chopped and ground state and a content thereof may range from 1.4 to 1.6 wt. %.

When replacing the sugar with honey in the additives, a content of the honey may range from 7 to 9 wt. %.

Hereinafter, a method for manufacturing a processed food according to an embodiment of the present invention will be described with reference to FIG. 1.

FIG. 1 is a flow chart illustrating a process of the method for manufacturing a spread type processed food using foie gras and chicken breasts according to the embodiment of the present invention. As shown in FIG. 1, the method for manufacturing a processed food according to the embodiment of the present invention may include a cleaning step (ST1), a salt-seasoning step (ST2), a pre-treatment step (ST3), a cooking step (ST4), a mixing and grinding step (ST5), and a filtering and chilling step (ST6).

Cleaning Step (ST1)

As a foie gras, a loaf of duck liver is prepared. The duck liver is washed with running water to clearly remove foreign matters or secretions on a surface of the duck liver, followed by dicing the same into a predetermined size. At this time, the dicing is preferably conducted to prepare in a size of about 1 cm×1 cm, so that a marinade can evenly penetrate into the duck liver in a subsequent primarily liver smell removal step, thereby removing the fishy smell and the peculiar smell of the duck liver.

Meanwhile, before dicing the duck liver into the uniform size, a liver smell removing solution prepared by mixing Korean wine, that is, 'soju', ground garlic and citron liquid is injected into the duck liver through a syringe in order to maximize liver smell removal effects. Then, the duck liver containing the liver smell removing solution is put on a steamer, steamed over medium heat for 1 to 2 minutes, and then, rotated by a rotational device (not shown) for 1 to 2 minutes so as to allow the injected liver smell removing solution to evenly penetrate inside the duck liver.

In this case, the duck liver is steamed in the steamer to boil the surface of the duck liver only while preventing the liver smell removing solution from spilling out of the duck liver. Further, the duck liver is rotated at a low speed in order to maintain the duck live in a half-boiled state not to be broken. For example, the rotation may be conducted at 100 to 300 RPM. Further, the rotational device may be, for example, a mixer without a blade.

Salt-Seasoning Step (ST2)

The liver smell is primarily removed by treating the diced duck liver at a predetermined size with a mixture of soju and ground garlic as a marinade to remove the fishy smell and the peculiar smell of the duck liver. Herein, the primarily liver smell removal step may include dicing the duck liver into a uniform size and removing the liver smell with the marinade. Therefore, the marinade may evenly penetrate inside the duck liver to effectively remove the fishy smell and the peculiar smell of the duck liver, compared to a loaf of duck liver.

Pre-Treatment Step (ST3)

One of the main raw materials, that is, the chicken breasts are vacuum packed and undergo sous vide cooking at a constant temperature for a predetermined time. In this case, the sous vide cooking is conducted to make the chicken breasts to have a soft texture capable of being spread. Thereafter, the marinated duck liver is washed in the running clean water.

Cooking Step (ST4)

The marinated duck liver is cooked to secondarily remove the liver smell. In this case, a secondary liver smell removal step may include cooking the duck liver using a predetermined amount of soju of 50 ml in Flambee method in order to prevent the diced duck liver from being broken. The Flambee cooking method may be conducted in a method of boiling the duck liver by heating the soju, thereby removing the liver smell by volatilizing along with alcohol.

Mixing and Grinding Step (ST5)

The sous vide-cooked chicken breasts and the cooked duck liver were put into a blender (a mixer) along with butter, whipped cream, brandy, cassava powders and additives, followed by finely grinding the same. Herein, the additives may include sugar, salt, pepper, phosphates and antioxidants. Further, raw ginseng may be finely ground and added to the above blender. Furthermore, honey may be used in place of sugar.

The butter and the whipped cream are added for soft texture. In addition, the phosphates and the antioxidants may be added to inhibit microbial growth while preventing oxidation. Further, the brandy may be added to remove the fishy smell and odor of the duck liver. Furthermore, the cassava powders contain a large amount of vitamin C to help iron absorption, and also are rich in dietary fibers to give aid for digestion and to tenderize the food texture.

Filtering and Chilling Step (ST6)

The blended food is filtered through a sieve and put in a vessel, followed by chilled storage at a predetermined temperature.

Example 1

After washing a duck liver in a loaf form of 30 to 40 g with the running water to remove liver secretions and dicing the duck liver in a size of 1 cm×1 cm, 200 g of whole diced duck liver was subjected to salt-seasoning with a marinade prepared by mixing 5 g of garlic and 20 ml of soju, for 50 to 80 minutes, preferably, about 60 minutes, thereby primarily removing fishy smell and odor, that is, liver smell of the duck liver.

Then, raw chicken breasts were vacuum-packed and cooked in sous vide mode (low-temperature cooking) at 50 to 80° C., preferably, 62° C. for 20 to 50 minutes, preferably, 35 minutes. Further, the marinated duck liver was clearly washed and cooked in Flambee method by pouring 50 ml of soju and boiling the same at 78 to 110° C. or more for 5 to 10 minutes, thereby secondarily removing the liver smell.

Subsequently, the sous vide-cooked chicken breasts, the Flambee-cooked duck liver, butter, whipped cream, brandy, cassava powders, and additives including sugar, salt, pepper, phosphates and antioxidants were put into a blender, followed by finely grinding the mixture to manufacture a spread type processed food.

In this case, an introduced amount (g) and a mixing ratio (wt. %) of the composition in the above mixing and grinding step with respect to the processed food are shown in Table 1 below.

TABLE 1

| Name of raw materials | Introduced amount (g) | Mixing ratio (wt. %) |
| --- | --- | --- |
| Duck liver | 40 | 12.02 |
| Chicken breast | 150 | 45.09 |
| Butter | 40 | 12.02 |
| Whipped cream | 70 | 21.04 |
| Sugar | 3 | 0.90 |
| Salt | 3 | 0.90 |
| Pepper | 1 | 0.30 |
| Phosphate | 0.6 | 0.18 |
| Antioxidant | 0.06 | 0.02 |
| Brandy | 5 | 1.50 |
| Cassava powder | 20 | 6.01 |
| Purified water | — | The rest is filled with purified water if total mixing ratio does not reach 100 wt. % |

Then, after manufacturing, the processed food was filtered through a sieve and put in a vessel, followed by chilled-storage at a predetermined temperature.

Example 2

The same procedures described in Example 1 were conducted to manufacture a processed food, except that the introduced amount (g) and the mixing ratio (wt. %) of the composition in the mixing and grinding step with regard to the processed food are shown in Table 2 below.

TABLE 2

| Name of raw materials | Introduced amount (g) | Mixing ratio (wt. %) |
|---|---|---|
| Duck liver | 40 | 11.85 |
| Chicken breast | 150 | 44.42 |
| Butter | 40 | 11.85 |
| Whipped cream | 70 | 20.73 |
| Sugar | 3 | 0.89 |
| Salt | 3 | 0.89 |
| Pepper | 1 | 0.30 |
| Phosphate | 0.6 | 0.18 |
| Antioxidant | 0.06 | 0.02 |
| Brandy | 5 | 1.48 |
| Cassava powder | 20 | 5.92 |
| Raw ginseng | 5 | 1.48 |
| Purified water | — | The rest is filled with purified water if total mixing ratio does not reach 100 wt. % |

Example 3

The same procedures described in Example 1 were conducted to manufacture a processed food, except that the introduced amount (g) and the mixing ratio (wt. %) of the composition in the mixing and grinding step with regard to the processed food are shown in Table 3 below.

TABLE 3

| Name of raw materials | Introduced amount (g) | Mixing ratio (wt. %) |
|---|---|---|
| Duck liver | 40 | 11.12 |
| Chicken breast | 150 | 41.71 |
| Butter | 40 | 11.12 |
| Whipped cream | 70 | 19.46 |
| Honey | 30 | 8.34 |
| Salt | 3 | 0.83 |
| Pepper | 1 | 0.28 |
| Phosphate | 0.6 | 0.17 |
| Antioxidant | 0.06 | 0.02 |
| Brandy | 5 | 1.39 |
| Cassava powder | 20 | 5.56 |
| Purified water | — | The rest is filled with purified water if total mixing ratio does not reach 100 wt. % |

Example 4

The same procedures were conducted to manufacture a processed food except that, before the dicing step, a liver smell removing solution including a mixture of 20 ml of soju, 5 g of ground garlic and 10 ml of citron liquid was injected into the duck liver by a syringe, the duck liver containing the liver smell removing solution was put in a steamer, and then, steamed over medium heat for 1 to 2 minutes just enough to boil the surface of the duck liver while preventing the liver smell removing solution from spilling out of the duck liver, followed by rotating the same in a rotational device at 100 to 300 RPM for 1 to 2 minutes so as to allow the injected liver smell removing solution to evenly penetrate inside the duck liver.

Comparative Example 1

The same procedures described in any one of Examples 1 to 3 were conducted to manufacture a processed food, except that the salt-seasoning step (ST2), the pre-treatment step (ST3), the cooking step (ST4), the mixing and grinding step (ST5), and the filtering and chilling step (ST6) were carried out without dicing the loaf of duck liver into a uniform size.

Comparative Example 2

The same procedures described in Example 4 were conducted to manufacture a processed food, except that the salt-seasoning step (ST2), the pre-treatment step (ST3), the cooking step (ST4), the mixing and grinding step (ST5), and the filtering and chilling step (ST6) were carried out in sequential order without dicing the loaf of duck liver into a uniform size.

Comparative Example 3

The same procedures described in any one of Examples 1 to 3 were conducted to manufacture a processed food, except that a steam-cooking method was used in place of Flammbee method in the secondary liver smell removal stage in the salt-seasoning step (ST2).

Comparative Example 4

The same procedures described in Example 4 were conducted to manufacturing a processed food, except that a steam-cooking method was used in place of Flammbee method in the secondary liver smell removal stage in the salt-seasoning step (ST2).

Comparative Example 5

The same procedures described in any one of Examples 1 to 3 were conducted to manufacture a processed food, except that the brandy was not added in the mixing and grinding step (ST5).

Comparative Example 6

The same procedures described in Example 4 were conducted to manufacture a processed food, except that the brandy was not added in the mixing and grinding step (ST5).

Sensory Evaluation

After food testing the processed foods manufactured in the examples and comparative examples by 10 adults, a sensory evaluation was performed in 9 point scaling manner to obtain an average value, resultant values thereof are shown in Table 4 below.

Fishy smell and peculiar smell (odor): 1 point=very strong, 9 point=no smell
Food texture (spreadability): 1 point=very dry and crumbling, 9 point=extremely soft
Overall preference: 1 point=very bad, 9 point=excellent

TABLE 4

| | Fishy smell and odor | Food texture (spreadability) | Overall preference |
|---|---|---|---|
| Example 1 | 8.43 | 8.34 | 8.41 |
| Example 2 | 8.54 | 8.35 | 8.46 |
| Example 3 | 8.57 | 8.40 | 8.45 |
| Example 4 | 8.75 | 8.48 | 8.52 |
| Comparative Example 1 | 6.54 | 7.56 | 7.03 |
| Comparative Example 2 | 6.72 | 7.78 | 7.34 |
| Comparative Example 3 | 6.84 | 7.34 | 7.02 |

TABLE 4-continued

|  | Fishy smell and odor | Food texture (spreadability) | Overall preference |
|---|---|---|---|
| Comparative Example 4 | 7.02 | 7.42 | 7.25 |
| Comparative Example 5 | 7.12 | 7.34 | 7.24 |
| Comparative Example 6 | 7.32 | 7.42 | 7.37 |

As shown in the above Table 4, it could be confirmed that the processed foods manufactured in Examples 1 to 4 of the present invention were excellent in aspects of fishy smell and odor, food texture (spreadability) and overall preference, compared to the processed foods manufactured in Comparative Examples 1 to 6. In particular, it could be seen that salt-seasoning and cooking the duck liver after dicing resulted in excellent removal efficiency of fishy smell and odor rather than salt-seasoning and cooking the duck liver in the loaf form. Further, as described in Example 4, it could be confirmed that, when injecting the liver smell removing solution into the duck liver through a syringe and steaming over medium heat, followed by rotating the same in a rotational device so as to allow the liver smell removing solution to evenly penetrate inside the duck liver, remarkably excellent effects of removing fishy smell and odor of the processed food were achieved, in addition, food texture and overall preference were also excellent.

As described above, technical ideas of the present invention have been specifically described in the preferred embodiments, however, the above preferred embodiments are only intended to illustrate the present invention and are not intended to limit the scope thereof. Therefore, those skilled in the art will appreciate that various embodiments may be possible by combining the embodiments of the present invention within the scope of the present invention.

The invention claimed is:

1. A method for manufacturing a spread type processed food using a duck liver and chicken breasts, comprising:
    (a) washing a loaf of duck liver with running water to remove secretions;
    (b) dicing the loaf of duck liver into a uniform size;
    (c) salt-seasoning the diced duck liver with a marinade prepared by mixing 5 g of garlic and 20 ml of soju, for 50 to 80 minutes to primarily remove liver smell;
    (d) vacuum packing raw chicken breasts and cooking the same in sous vide mode at 50 to 80° C. for 20 to 50 minutes;
    (e) washing the marinated duck liver with clean water, pouring 50 ml of soju to the marinated duck liver, and then, cooking the same in flambe method at a temperature of 78 to 110° C. for 5 to 10 minutes in order to secondarily remove the liver smell; and
    (f) introducing 9 to 14 wt,% of the flambe-cooked duck liver, 38 to 50 wt,% of the sous vide-cooked chicken breasts, 10 to 14 wt. % of butter, 17 to 23 wt. % of whipped cream, 1.3 to 1.6 wt. % of brandy, 5 to 7 wt. % of cassava powders, additives and purified water into a blender, followed by grinding the mixture so as to manufacture a processed food in a spread form,
    wherein further comprising: between step (a) and step (b), injecting a liver smell removing solution, which is prepared by mixing 20 ml of soju, 5 g of ground garlic and 10 ml of citron liquid, into the duck liver through a syringe, steaming the duck liver in a steamer for 1 to 2 minutes to boil a surface of the duck liver only while preventing the liver smell removing solution from spilling out of the duck liver, followed by rotating the duck liver at 100 to 300 RPM for 1 to 2 minutes so as to allow the liver smell removing solution injected into the duck liver to evenly penetrate inside the duck liver.

2. A processed food manufactured by the method for manufacturing a spread type processed food using foie gras and chicken breasts according to claim 1.

* * * * *